(12) United States Patent
Williams et al.

(10) Patent No.: US 7,969,331 B2
(45) Date of Patent: Jun. 28, 2011

(54) SYSTEM AND METHOD FOR VERIFYING ENTRY OF KEYSTROKES RECEIVED FROM A CAPACITIVE KEYPAD

(75) Inventors: Doug Williams, St. Joseph, MI (US); Rick Helm, Crystal Lake, IL (US); William Joseph Taylor, Crystal Lake, MI (US); Robert M. Libbe, Schaumburg, IL (US)

(73) Assignee: Nidec Motor Corporation, St. Louis, MO (US)

( * ) Notice: Subject to any disclaimer, the term of this patent is extended or adjusted under 35 U.S.C. 154(b) by 1012 days.

(21) Appl. No.: 11/879,900

(22) Filed: Jul. 19, 2007

(65) Prior Publication Data
US 2009/0021401 A1 Jan. 22, 2009

(51) Int. Cl.
*H03M 11/00* (2006.01)
(52) U.S. Cl. ............... 341/33; 341/20; 200/302.1
(58) Field of Classification Search ............... 341/20–35; 200/600, 302.1–302.3; 400/479.1; 178/18.06, 178/18.02; 345/174
See application file for complete search history.

(56) References Cited

U.S. PATENT DOCUMENTS

| 4,876,461 | A | 10/1989 | Gratke |
| 5,036,321 | A * | 7/1991 | Leach et al. ............... 341/33 |
| 6,621,484 | B1 | 9/2003 | Yee |
| 6,630,927 | B2 | 10/2003 | Sherman et al. |
| 7,256,714 | B2 * | 8/2007 | Philipp ............... 341/33 |
| 2006/0169764 | A1 | 8/2006 | Ross et al. |

* cited by examiner

*Primary Examiner* — George A Bugg
*Assistant Examiner* — Franklin Balseca
(74) *Attorney, Agent, or Firm* — Maginot, Moore & Beck LLP

(57) ABSTRACT

A method for resetting a key decoder coupled to a plurality of capacitive keys to prevent processing of a key code generated by a ghosting condition. The method includes receiving a key code from a key decoder that corresponds to a first capacitive key of a capacitive keypad, detecting a ghosting condition for a second capacitive key that does not correspond to the detected key code, and resetting a key decoder in response to the ghosting condition being detected.

20 Claims, 4 Drawing Sheets

SYSTEM AND METHOD FOR VERIFYING ENTRY OF KEYSTROKES RECEIVED FROM A CAPACITIVE KEYPAD

TECHNICAL FIELD

The device described below generally relates to capacitive keypads that are used to input operator information into appliances. More specifically, the device relates to verification of operator commands entered into appliances with a capacitive keypad.

BACKGROUND

Mechanical actuators in the form of keys, buttons, switches, and other actuators have long been used for the entry of operation commands and parameters to machines, such as household appliances. Various issues, however, have led to the replacement of mechanical keys or buttons with data entry components that electrically sense data input, such as capacitive switches. One of the issues leading to the replacement of mechanical actuators with capacitive switches is the wear and tear of moving parts in mechanical actuators. Because capacitive sensing does not require moving parts for data input, the capacitive switches have a longer life. Moreover, capacitive switches are typically sealed with a protective membrane. The membrane helps protect the switches from environmental conditions, such as dirt or spillages. This protection makes capacitive sensors especially suitable in devices that need to be cleaned regularly, as the sensor is not exposed to cleaning agents or other foreign substances. Thus, capacitive switches are especially useful in household appliances that are exposed to dirt, spillage, and other contaminations.

A typical capacitive switch includes a pair of electrical conductors separated by a dielectric, such as air. Each conductor may be, for example, a metal trace that is applied as a layer on a printed circuit board (PCB). An excitation source is connected to one of the two conductors. The conductor coupled to the excitation source is sometimes called an emitter and the other conductor is sometimes called a receiver. An electrical field is formed between the emitter and the receiver. Most of the electrical field is concentrated between the emitter and the receiver on the PCB, however, a fringe field extends out of the PCB from the emitter. The capacitance of the capacitive switch may be measured with a capacitance measurement circuit. The measurement circuit may be a frequency counter that is coupled to the output of a relaxation oscillator that has the capacitive switch coupled to one of its inputs. The capacitive switch is also coupled to a current source and a discharge switch is coupled to the other oscillator input. The discharge switch opens and closes in response to the signal on the output of the oscillator. The charging and discharging of the capacitor through the discharge switch generates a signal having a frequency that is related to the capacitance of the switch. By counting the frequency during a fixed period, a value for the untouched switch may be determined. In other known devices, a sigma-delta capacitance-to-digital converter senses the capacitance formed between the two conductors across the dielectric and generates a digital data value corresponding to this capacitance.

When a human finger approaches a capacitive switch, the capacitance of the person's finger affects the capacitance of the switch. The change in the switch capacitance affects the frequency of the relaxation oscillator or the value generated by a sigma-delta capacitive-to-digital converter. The change in capacitance may be detected by the change in the value generated by the converter or the frequency count measured during the fixed time period. By comparing the change to some threshold value, touching of a capacitive switch may be detected. Thus, touching a capacitive switch is analogous to depressing a mechanical switch. Identification of the touched key provides an appliance with data for control of the appliance.

The above description assumes that the capacitance of a capacitive switch remains relatively constant as long as the switch is not touched. However, capacitance of a switch may change in response to ambient air changes, such as temperature and humidity, as the air is the dielectric for the capacitor. If the capacitance of a switch changes significantly, it may approach the threshold that indicates the switch has been touched. If the capacitance reaches or passes through the threshold, the appliance may process data corresponding to the key even though a user has not touched the key. The erroneous detection of a key being touched in response to ambient air changes is commonly called ghosting. Ghosting may cause an appliance to respond to false commands. Therefore, reducing the likelihood that an appliance processes commands corresponding to a capacitive switch in response to environmental condition changes is desirable.

SUMMARY

In response to ghosting occurring with the use of capacitive keypads, a method has been developed that makes processing of a capacitive switch in ghosting conditions less likely. The method includes receiving a key code from a key decoder that corresponds to a first capacitive key of a capacitive keypad, detecting a ghosting condition for a second capacitive key that does not correspond to the received key code, resetting the key decoder in response to the ghosting condition being detected.

The method for detecting and responding to ghosting conditions may be implemented by a data entry system. The data entry system includes a key decoder coupled to a plurality of capacitive keys, the key decoder generates a code corresponding to a capacitive key transitioning to a capacitance indicative of the capacitive key being touched, a key selector coupled to the key decoder for generating at least one key identifier that does not correspond to the key code generated by the key decoder, a ghost condition detector coupled to the key selector and configured to detect a ghosting condition with reference to a signal from the at least one key corresponding to the at least one key identifier received from the key selector and a ghosting threshold. The data entry system may also include a ghost condition timer coupled to a ghost condition comparator in the ghost condition detector and to the key decoder. The ghost condition timer is activated in response to the ghost condition comparator generating a ghosting condition active signal and the key decoder being reset in response to the ghost condition timer expiring and the ghosting condition active signal continuing to be generated by the ghost condition comparator at the expiration of the ghost condition timer.

BRIEF DESCRIPTION OF THE DRAWINGS

Features of the present invention will become apparent to those skilled in the art from the following description with reference to the drawings, in which.

DETAILED DESCRIPTION

Figure 1:
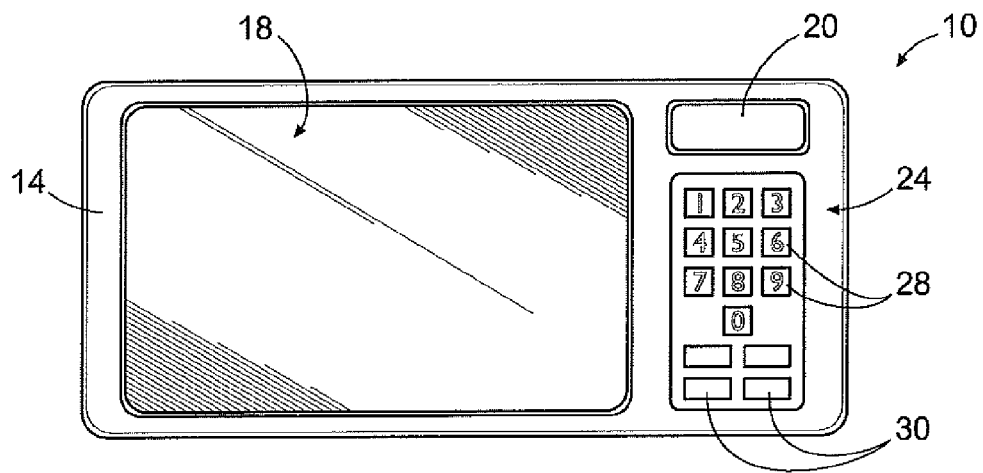
FIG. 1 is a plan view of an appliance having a data entry system that detects ghosting conditions in capacitive keys associated with the appliance.

As shown in FIG. 1, an appliance 10, such as a microwave oven, is provided with a door 14 covering a cavity 18, a display 20 and a capacitive keypad 24. The capacitive keypad includes numeric keys 28 and function keys 30. As set forth in more detail below, the capacitive keypad is coupled to a data entry system that validates the entry of data using the keys 28 and 30 on the capacitive keypad 24. After validation, the display is illuminated with the data entered through the keypad 24.

Figure 2:
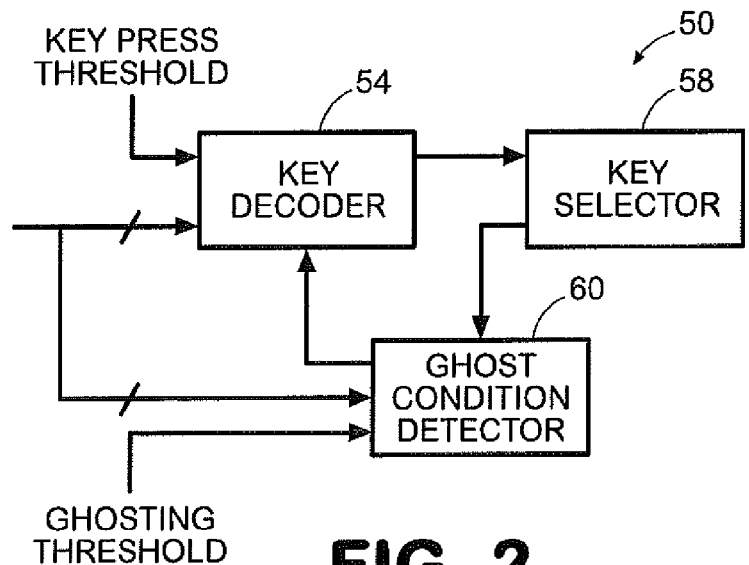
FIG. 2 is a block diagram of the data entry system that detects ghosting conditions in capacitive keys associated with the appliance of FIG. 1.

As shown in FIG. 2, a data entry system 50 includes a key decoder 54, a key selector 58, and a ghost condition detector 60. The key decoder 54 is coupled to the capacitive keypad 24 to receive signals from the keys 28 and 30 that correspond to the capacitance at each key. These signals are compared by the key decoder 54 to a key press threshold to determine whether a key has been touched. For example, if a relaxation oscillator is coupled to a capacitive key to generate a frequency count for some period of time, the count is compared to a key press threshold. The key press threshold in this case is a frequency count for the fixed time period that corresponds to a minimum frequency count that indicates a key has been touched. If the frequency count equals or exceeds the key press threshold, then the key decoder generates a code for the data corresponding to the touched key. For example, touching the "Cook" key causes the key decoder to generate a code corresponding to the "Cook" command that is processed by the control circuit for the appliance 10. Key decoders are also capable of detected multiple key touches and generating multiple codes. For example, some functions may require two or more function keys being touched simultaneously. The key decoder in this case generates two codes, each of which corresponds to one of the keys touched for performance of the function. Other key decoder circuits using other methods of detecting keys being touched may be used. Key decoders are known in the art. Likewise, methods for determining appropriate key press thresholds for use in key decoders are also known.

In previously known appliance control systems, the codes generated by a key decoder 54 are provided to a control circuit for operating the appliance in accordance with the entered data and/or command. Such systems may operate the appliance in response to keys that have changed in their capacitance values because ambient air conditions have changed rather than because a key has actually been touched. The key selector 58 and the ghost condition detector 60 enable the data entry system 50 to exhibit some immunity to changes in environmental conditions and to detect ghosting conditions that may have resulted in the key decoder generating codes without any keys being touched.

In further detail, the key selector 58 receives the code indicative of the key for which the key decoder 54 has generated the code. The key selector then selects one or more of the keys other than the one corresponding to the generated code for monitoring. If the key decoder 64 generated more than one code, as may occur if two keys are simultaneously touched for performance of a function, the key selector 58 selects one or more of the keys other than the two keys corresponding to the two generated codes. A key identifier is generated by the key selector 58 and used to couple the signal from the corresponding capacitive key to the ghost condition detector 60. If more than one key is to be monitored, the signal from each of the keys is coupled to the ghost condition detector 60. The ghost condition detector may include one or more comparators. Each comparator is coupled to a ghosting threshold. The ghosting threshold is analogous to the key press threshold, but its value is lower than the key press threshold. For example, if a key press threshold represents a frequency count, then the ghosting threshold represents a smaller frequency count that indicates the capacitance of the key has changed, but has not reached the key press threshold. In other embodiments, the key press and ghosting thresholds may be voltage or current reference signals, as well as other representations of threshold values. In response to a comparator detecting that a signal from a capacitive key is equal to or greater than the ghosting threshold, the comparator generates a ghosting condition active signal. The ghosting condition active signal is coupled to the key decoder 54 to reset the key decoder. Thus, if one or more keys, other than the one detected as being "touched," indicate ghosting conditions are present, the key decoder 54 is reset to see if the "touched" key generates another signal indicative that is key is being touched.

In embodiments where more than one key is monitored for ghosting conditions, the outputs of the comparators may be coupled to a circuit for generation of the ghost condition active signal. For example, the comparator outputs may be coupled to the inputs of an AND gate or the like to generate a ghosting condition signal if all of the keys are generating signals that are equal to or greater than the ghosting threshold. In another example, an OR circuit is coupled to the comparator outputs so any comparator may cause the ghost condition active signal to be generated. Alternatively, a majority circuit or the like may be used to generate a ghosting active signal in response to one half or more of the monitored keys being equal to or greater than the ghosting threshold. By monitoring multiple keys, ghosting conditions are less likely to be detected when some of the capacitive keys are more sensitive to transient ambient air changes. Other monitoring arrangements may include monitoring capacitive keys not corresponding to a generated code in the immediate vicinity of the "touched" key. In yet another arrangement, capacitive keys not corresponding to the generated code that are located at corner positions may be monitored to evaluate whether all or mostly all of the keypad 24 is being subjected to ghosting conditions.

Figure 3:
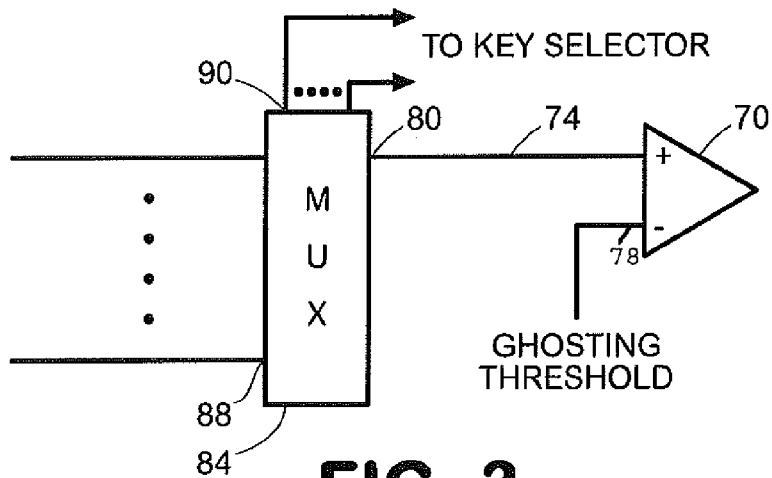
FIG. 3 is a schematic of an exemplary arrangement of components comprising the ghost condition detector shown in FIG. 2.

In more detail, the ghost condition detector 60 may include a differential amplifier 70 having a non-inverting input 74 and an inverting input 78 as shown in FIG. 3. The inverting input 78 may be coupled to the ghosting threshold as shown in the figure, although it may be coupled to the non-inverting input 74 instead. The other input, which is the non-inverting input 74 in FIG. 3, is coupled to the output 80 of a multiplexer 84. The inputs 88 of the multiplexer 84 are coupled to signals from all or a subset of the capacitive keys 28 and 30 in keypad 24. The key signal passed by the multiplexer 84 corresponds to the key identifier received from the key selector 58 on the selector inputs 90 of the multiplexer 84. Thus, the output of the comparator 70 is a ghosting condition active signal in response to the signal from the selected key being equal to or greater than the ghosting threshold. Duplications of this comparator circuit or other comparator circuits may be used to monitor multiple keys for ghosting conditions. For example, a processor may input digital values for a frequency corresponding to a key capacitance from a frequency counter and compare the digital value to a ghosting threshold stored in the memory for the processor.

The ghost condition detector 60 and the key selector 58 may be implemented with a general purpose processor that executes programmed instructions stored in a memory. The processor may be configured to interact with general purpose interface circuitry, such as multiplexers, timers, A/D and D/A converters, or the like, to provide and receive control signals for the operation of the data entry system 50. The data entry system 50 may also be implemented as modules or subroutines executed by a general purpose microprocessor or microcontroller operating to control the operation of the appliance. Alternatively, the data entry system 50 may be implemented with an application specific integrated circuit (ASIC), which includes a memory containing programmed instructions and appropriate input/output interface circuitry for receiving and providing control signals for operation of the data entry system 50 or overall control of a specific appliance. The functions of the data entry system may also be implemented with electronic components configured in appropriate circuits without programmed instruction control, although reconfiguring of electronic components is not as easily done as components executing programmed instructions. Also, the processor may be implemented with a combination of programmed components and electronic components.

To determine whether the ghosting conditions are not merely transitory, the ghost condition detector 60 of the data entry system 50 may also include a ghost condition timer. The timer may be implemented with programmed instructions, as a separate hardware component interfaced with the ghost condition detector 60, or with a combination of hardware and programmed instructions. The ghost condition timer is activated in response to the ghost condition detector 60 generating a ghost condition active signal as explained above. The ghost condition active signal may be output from a single ghost condition comparator or one of the ghost condition signal generation circuits, such as the AND circuit, OR circuit, or majority circuit, discussed above. A signal indicative of the timer expiring may be combined with the output of the ghost condition detector 60 using a logical AND operation and this signal may be coupled to the key decoder 20 to reset the decoder in response to ghost conditions being detected. Alternatively, the ghost condition detector 60 may be configured so the output of the ghost condition detector 60 must remain active during the duration of the ghost condition timer counting of the ghost time period before a ghost active signal is generated to reset the key decoder 54. The ghost condition timer may have a single fixed length ghost time period or the ghost time period may be varied. The timing length may be, for example, .01 seconds to 15 seconds, with longer and shorter time periods, as suitable for particular applications. By activating the timer upon detection of a key experiencing a ghost condition and reevaluating the ghosting condition upon expiration of the timer or throughout the ghost time period, the system and process for ghost condition detection is able to determine whether ghosting conditions are merely transitory.

With regard to safety-related keys, processing of the safety-related function corresponding to the key may be more important than evaluating the possibility the key was "touched" as a result of ghosting conditions. Therefore, the key selector 58 may be configured to determine whether a code received from the key decoder 54 corresponds to a safety-related key. In response to such a determination, the key may be processed without validating the data entry through evaluation of possible ghosting conditions.

The key selector 58 of the data entry system 50 may also be configured to detect an invalid key entry. Invalid key entries include signals being received from a capacitive key that are substantially greater than the key press threshold. In such a case, the key decoder 54 generates an invalid key code. Therefore, the key selector 58, upon detection of an invalid key code, may simply reset the key decoder 54 without activating the ghost condition detector 60.

Figure 4:
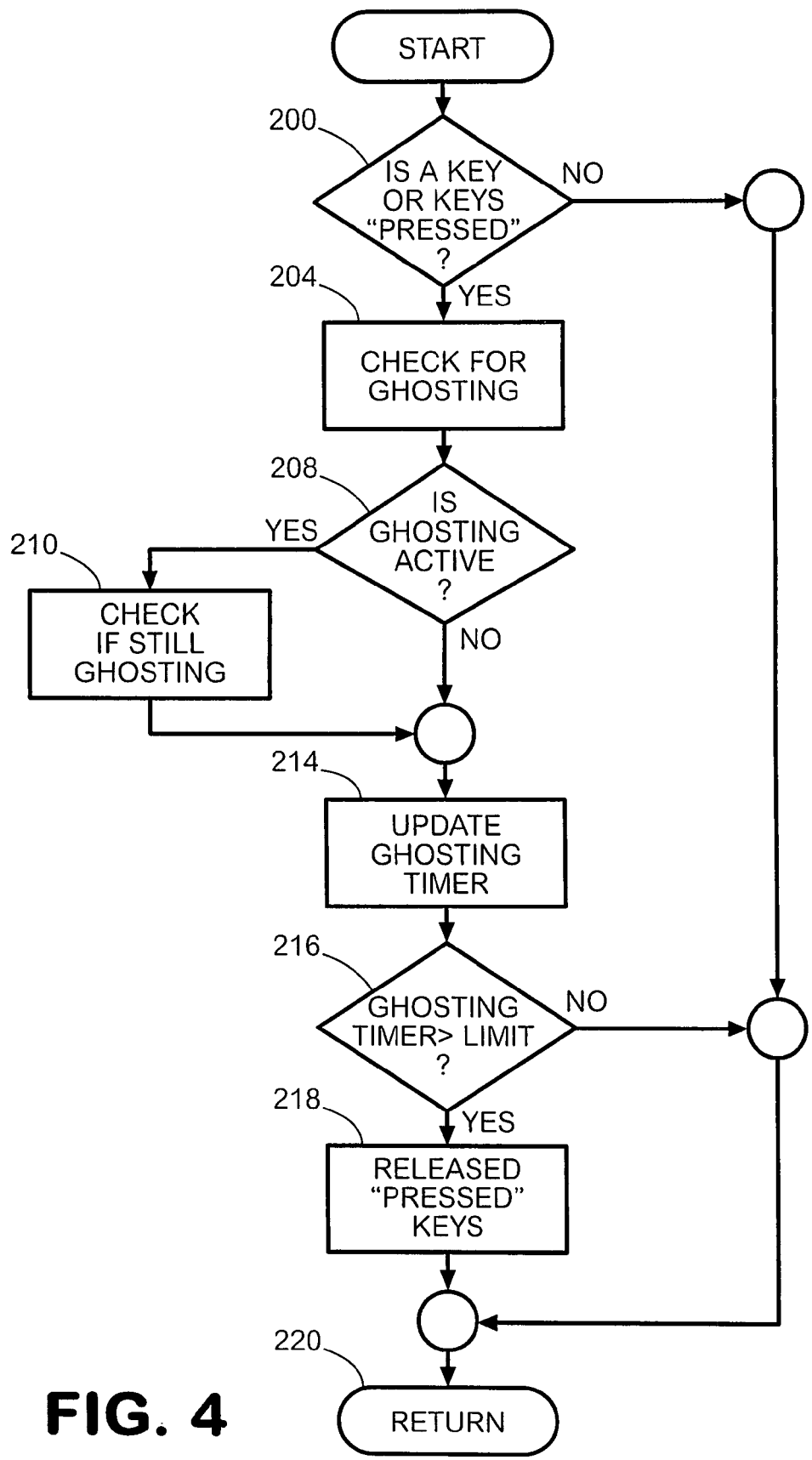
FIG. 4 is a flow diagram for a data entry process that may be implemented by the data entry system shown in FIG. 2.

Referring now to FIG. 4, a flow diagram that may be implemented by a data entry system is shown. The system begins by looking to see if the key decoder has detected a key being "touched" and a code or codes are available (block 200). If no key is detected as being touched, then no validation processing is required and the process returns to other control processes (block 220). If a key is detected as being touched, ghosting conditions are checked (block 204). If a ghost condition active signal is generated, the ghost condition timer is activated (block 208), and ghost condition checking continues (block 210). If no ghost conditions are detected, the process continues by updating the ghost condition timer (block 214) and then the ghost condition timer is checked for expiration (block 216). If it has not expired, the process continues to other control processes (block 220). If ghosting conditions were not detected, then the timer was not started and the key codes were validated for processing. Otherwise, the control process returns to the process of FIG. 4 as long as the ghost condition timer continues to count to evaluate ghosting conditions. If the ghost condition timer expires and the ghost condition detector is continuing to generate the ghost condition active signal, the key decoder is reset so the "touched" key is, in effect, released (block 218).

Figure 5:
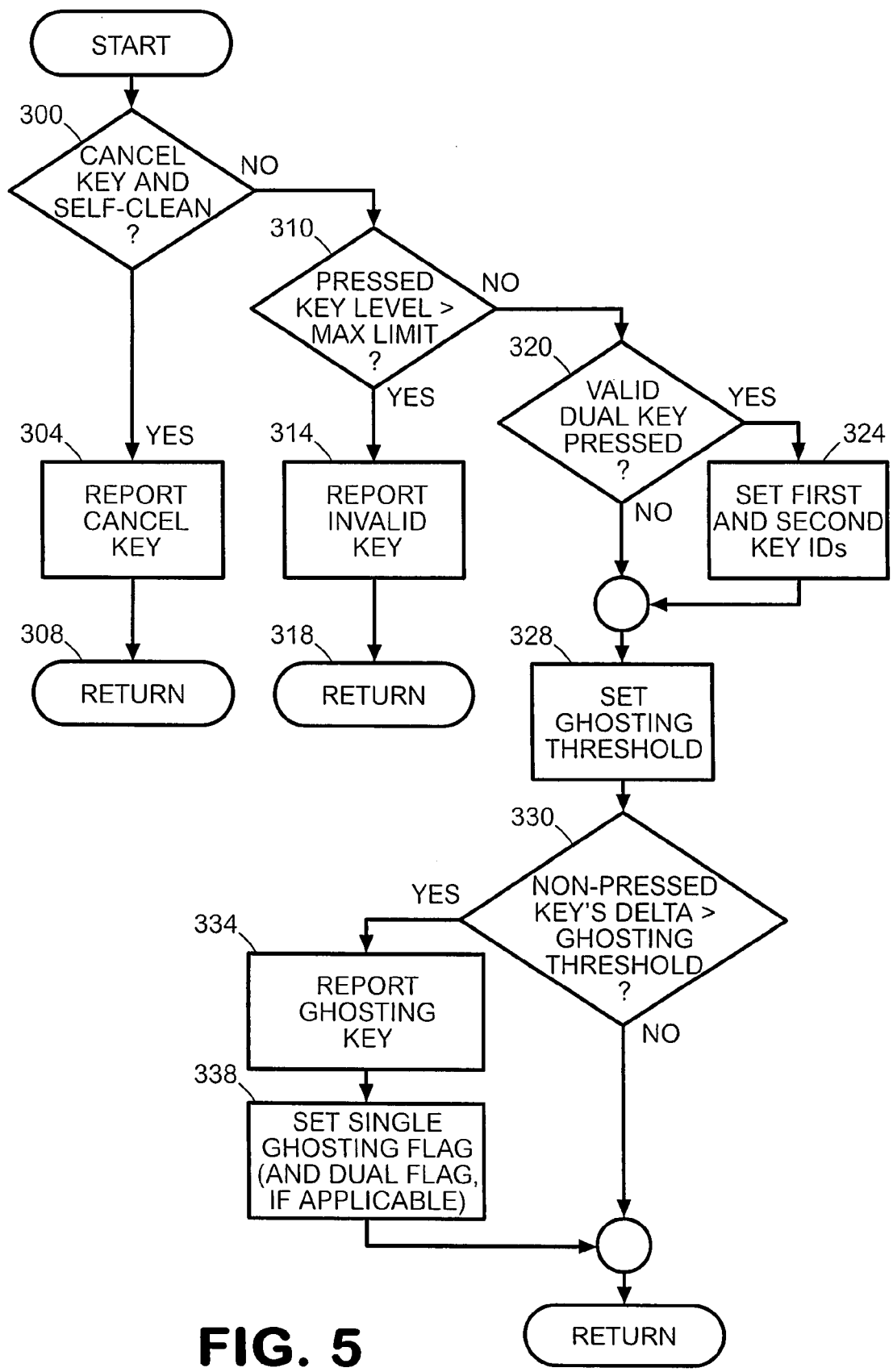
FIG. 5 is a flow diagram for a process of checking for ghosting conditions affecting the keypad shown in FIG. 2.

The process for evaluating ghost conditions (block 204, FIG. 4) is shown in FIG. 5. When ghost conditions are first checked, the code or codes received from the key decoder are tested to determine whether they are safety-related (block 300). If they are safety-related, such as the Cancel and Self-Clean keys depicted in FIG. 5, the safety-related command code is reported to the appliance controller for further processing (block 304). No other ghost condition evaluation occurs for that key detection (block 308). If the key code corresponds to an invalid key code (block 310), an invalid key entry is reported to the appliance controller for further processing (block 314). No other ghost condition evaluation occurs for that key detection (block 318).

Continuing with reference to FIG. 5, if a valid dual key combination has been "touched" (block 320), the key codes for the two keys are excluded from the key identifiers provided to the key selector (block 324). Otherwise, only the single key code is excluded. The key identifiers for the keys not detected as being "touched" are provided to the ghost condition detector for coupling key signals to the detector. The ghosting threshold is also set for the ghost condition detector (block 328). The selected key signals are compared to the ghosting threshold to determine whether any key detects a ghosting condition (block 330). If no ghosting condition is detected, the process terminates and the key codes are reported to the appliance controller for further processing. Otherwise, the ghosting key(s) are stored for additional reference (block 334) and the ghosting condition active flag is set (block 338). If a valid dual key combination was detected as being "touched," a flag is also set to indicate a dual key combination has been detected (block 338).

Figure 6:
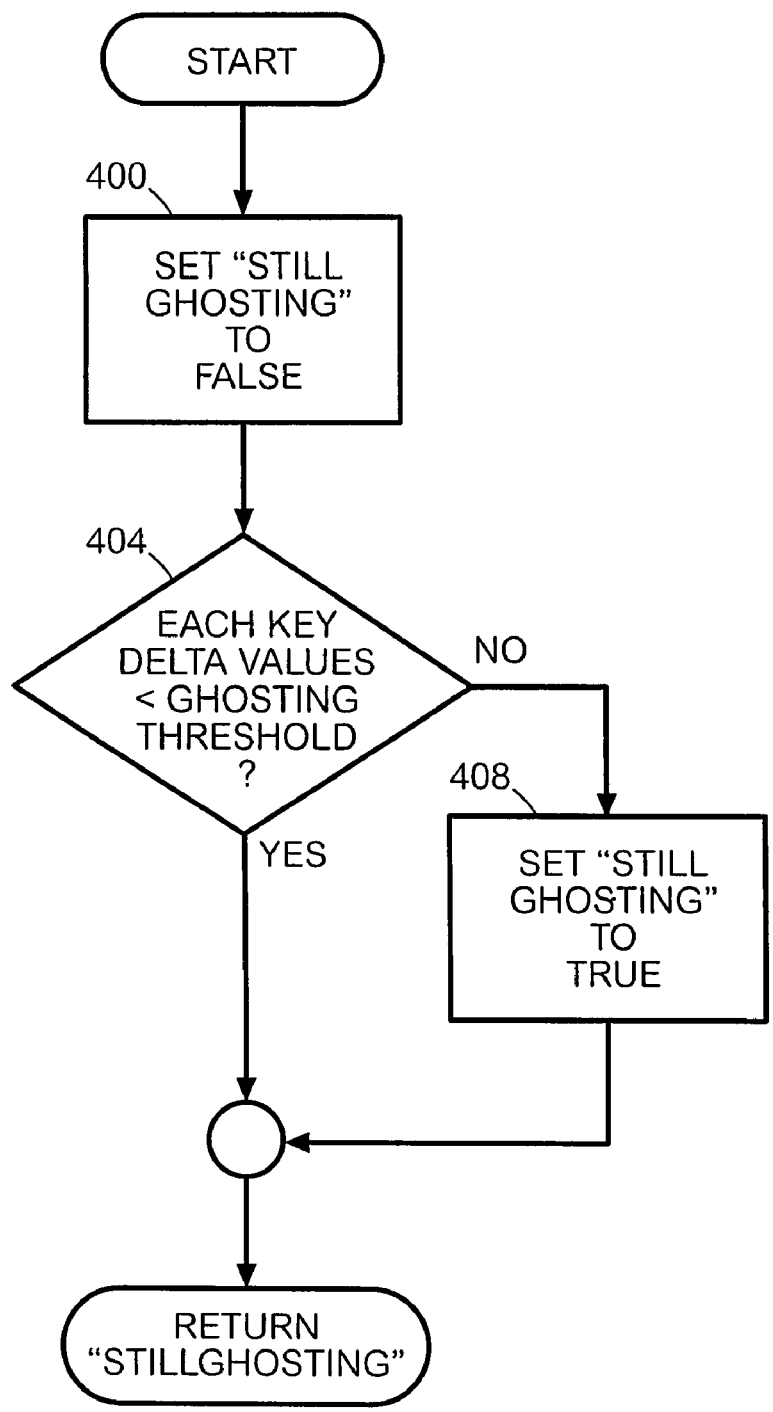
FIG. 6 is a flow diagram of a process for determining whether a detected ghost condition continues to remain active.

The process for evaluating ghost conditions (block 210, FIG. 4) is shown in FIG. 6. Upon entry of the process, a flag indicating ghost conditions are active is reset (block 400). The key signals coupled to the ghost condition detector are evaluated to determine whether any of the signals are equal to or greater than the ghosting threshold (block 404). If any key signal satisfies this test, the flag indicating ghost conditions are active is set (block 408). The process then returns to the process shown in FIG. 4 for further evaluation as described above.

The data entry system and method presented above enable validation of key press activity detected from capacitive keypads or switches to reduce the likelihood that keys are processed when ambient air conditions, such as high moisture, produce ghost actuations. The method and system help eliminate processing of ghost actuations by recognizing actuations caused by ghosting conditions and resetting the key decoder before the key codes are processed. The method and system handle safety-related key and invalid key activity differently to help ensure safe operation of the appliance.

As used above, the term "ghosting threshold" refers to a threshold value corresponding to a capacitance for a key that indicates the key may be responding to a ghosting condition. "Ghosting" occurs when the charge has depleted to a level that indicates the key has been touched, when in reality it has not. The "ghosting threshold" is a threshold value that corresponds to a capacitance that is between the capacitance of the key in environmental conditions that do not produce erroneous actuations and the capacitance that indicates a key has been touched. Thus, if a key is detected as being touched and the surrounding keys are at or have passed through the ghosting threshold, but have not yet reached the level indicative of key actuation, then the detected key may not have been touched.

The term "key press threshold" refers to a threshold value corresponding to a capacitance for a key that indicates the key has been touched. A "touched" key is validated and de-bounced before the data corresponding to the touched key is processed. "Validation" refers to the process of evaluating the capacitance of other keys not "touched" in the keypad to determine whether the "touched" key was touched or whether it is experiencing "ghosting." De-bouncing refers to the process of determining whether a solid strong signal is being received from the key rather than a grouping of off and on signals that may occur when a finger approaches a capacitive touch key.

Variations and modifications of the present invention are possible, given the above description. For example, thresholds may be selected or logical states reversed so that tests for conditions may be detected when signals are below thresholds or flags are active when reset. All variations and modifications that are obvious to those skilled in the art to which the present invention pertains, however, are considered to be within the scope of the protection granted by this Letters Patent.

What is claimed is:

1. A method of data entry for an appliance comprising:
receiving a key code from a key decoder that corresponds to a first capacitive key of a capacitive keypad;
detecting a ghosting condition for a second capacitive key that does not correspond to the received key code; and
resetting a key decoder in response to the ghosting condition being detected.

2. The method of claim 1 further comprising:
activating a ghosting condition timer in response to the detection of the ghosting condition;
monitoring the second capacitive key for the detected ghosting condition as the ghosting condition timer is counting; and
resetting the key decoder in response to the ghosting condition existing for the second capacitive key upon expiration of the ghosting condition timer.

3. The method of claim 1, the ghosting condition detection further comprising:
coupling a signal from the second capacitive key to a ghost condition comparator; and
comparing the coupled signal to a ghosting threshold to detect the ghosting condition.

4. The method of claim 3, the ghosting condition detection further comprising:
receiving an invalid key code for the first capacitive key; and
terminating ghosting condition detection in response to the invalid key code being received.

5. The method of claim 4, the ghosting condition detection further comprising:
receiving a key code that identifies the first capacitive key as a safety-related key; and
terminating ghosting condition detection in response to the safety-related key code being received.

6. The method of claim 1, the monitoring of the ghosting condition comprising:
coupling a signal from at least three capacitive keys in the plurality of capacitive keys, none of the at least three capacitive keys corresponding to the first capacitive key;
comparing the signal from each of the at least three capacitive keys to a ghosting threshold to detect the ghosting condition; and
terminating detection of the ghosting condition in response to each of the signals from the at least three capacitive keys being equal to or greater than the ghosting threshold.

7. The method of claim 1, the monitoring of the ghosting condition comprising:
coupling a signal from each capacitive key in the plurality of capacitive keys not corresponding to the first capacitive key;
comparing the signal from each capacitive key in the plurality of capacitive keys to a ghosting threshold to detect the ghosting condition; and
terminating detection of the ghosting condition in response to every signal from each capacitive key in the plurality of capacitive keys being equal to or greater than the ghosting threshold.

8. A data entry system for use in an appliance, comprising:
a key decoder coupled to a plurality of capacitive keys, the key decoder generates a code corresponding to a capacitive key transitioning to a capacitance indicative of a key being touched;
a key selector coupled to the key decoder, the key selector for selecting a signal from at least one key in the plurality of capacitive keys that does not correspond to the key code received from the key decoder;
a ghost condition detector being coupled to the signal selected by the key selector and being configured to detect a ghosting condition with reference to a ghosting threshold coupled to the ghost condition detector.

9. The data entry system of claim 8, the ghost condition detector further comprising:
a ghost condition comparator having an input coupled to the signal selected by the key selector and another input coupled to the ghosting threshold, the ghost condition comparator generating a ghost condition active signal in response to the selected signal being equal to or greater than the ghosting threshold; and the key decoder being coupled to the ghost condition comparator so the key decoder is reset in response to the ghost condition active signal being generated by the ghost condition comparator.

10. The data entry system of claim 8 further comprising:

a ghost condition timer coupled to the ghost condition comparator, the ghost condition timer being activated in response to the ghost condition comparator generating a ghost condition active signal; and the key decoder being reset in response to the ghost condition timer expiring and the ghost condition active signal continuing to be generated by the ghost condition comparator at expiration of the ghost condition timer.

11. The data entry system of claim 10, the key selector not selecting a signal from a capacitive key in response to the key decoder generating a safety-related key code.

12. The data entry system of claim 11, the key selector not selecting a signal from a capacitive key in response to the key decoder generating an invalid key code.

13. The data entry system of claim 8, the key selector selecting signals from more than one key in the plurality of capacitive keys, each selected signal corresponding to a key other than the key corresponding to the key code generated by the key decoder; and each selected signal being coupled to the ghost condition detector and the ghost condition detector being further configured to detect a ghosting condition with reference to each selected signal and the ghosting threshold.

14. The data entry system of claim 13, the ghost condition detector further comprising:

a plurality of ghost condition comparators, each comparator having an input coupled to one of the selected signals and another input coupled to the ghosting threshold, each ghost condition comparator generating a ghost condition active signal in response to the selected signal on the comparator's input being equal to or greater than the ghosting threshold.

15. The data entry system of claim 14, the outputs of the ghost condition comparators being coupled to a logical OR circuit and a ghost condition active signal is generated by the OR circuit in response to one of the selected signals being equal to or greater than the ghosting threshold.

16. The data entry system of claim 14, the outputs of the ghost condition comparators being coupled to a logical AND circuit and a ghost condition active signal is generated by the AND circuit in response to all of the selected signals being equal to or greater than the ghosting threshold.

17. The data entry system of claim 14, the outputs of the ghost condition comparators being coupled to a majority circuit and a ghost condition active signal is generated by the majority circuit in response to one half or more of the selected signals being equal to or greater than the ghosting threshold.

18. The data entry system of claim 14 further comprising:

a ghost condition timer coupled to each ghost condition comparator, the ghost condition timer being activated in response to one ghost condition comparator generating a ghost condition active signal; and the key decoder being reset in response to the ghost condition timer expiring and the ghost condition active signal continuing to be generated by the ghost condition comparator at expiration of the ghost condition timer.

19. The data entry system of claim 16 further comprising:

a ghost condition timer coupled to the AND circuit, the ghost condition timer being activated in response to the ghost condition active signal being generated by the AND circuit; and the key decoder being reset in response to the ghost condition timer expiring and the ghost condition active signal continuing to be generated by the AND circuit at expiration of the ghost condition timer.

20. The data entry system of claim 17 further comprising:

a ghost condition timer coupled to the majority circuit, the ghost condition timer being activated in response to the ghost condition active signal being generated by the majority circuit; and the key decoder being reset in response to the ghost condition timer expiring and the ghost condition active signal continuing to be generated by the majority circuit at expiration of the ghost condition timer.

* * * * *